July 31, 1956 W. BRANDES ET AL 2,756,633
MEANS FOR FASTENING EXCHANGEABLE OBJECTIVES
TO PHOTOGRAPHIC DEVICES
Filed Oct. 6, 1954
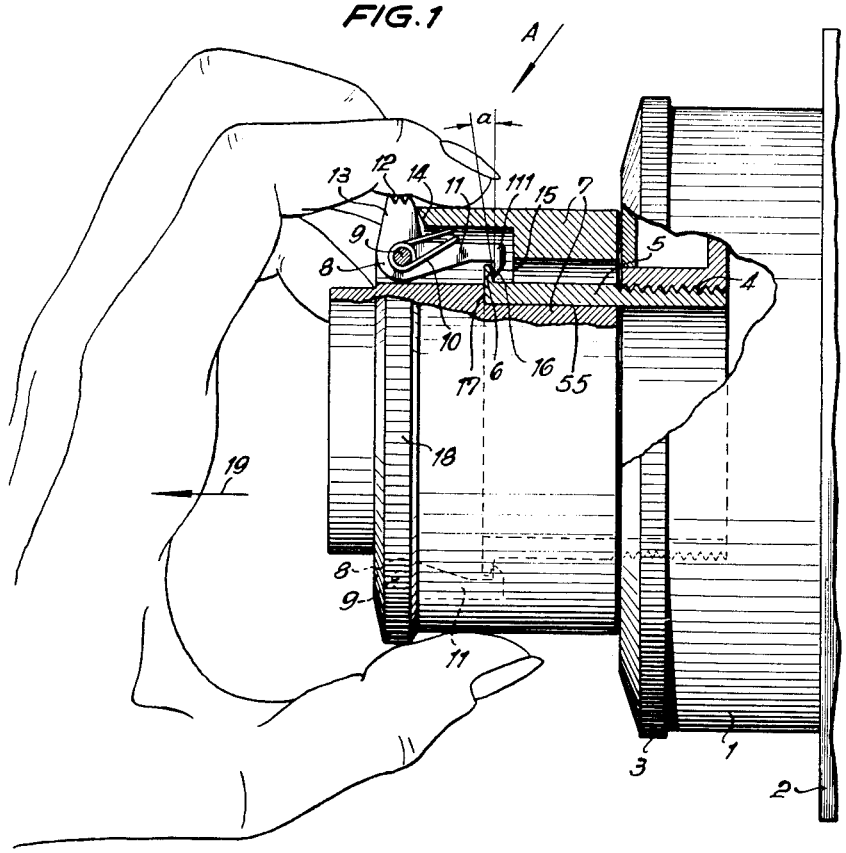
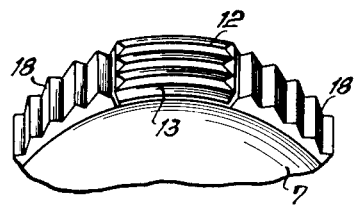
INVENTORS
Wilhelm Brandes
Erwin Doring
BY Mock & Blum
ATTORNEYS United States Patent Office 2,756,633
Patented July 31, 1956

2,756,633

MEANS FOR FASTENING EXCHANGEABLE OBJECTIVES TO PHOTOGRAPHIC DEVICES

Wilhelm Brandes and Erwin Doring, Braunschweig, Germany, assignors to Voigtlander A. G., Braunschweig, Germany, a corporation of Germany Application October 6, 1954, Serial No. 460,664

Claims priority, application Germany October 16, 1953

6 Claims. (Cl. 88—57)

This invention relates to novel and improved means for fastening exchangeable objectives and other auxiliary parts or attachments to photographic cameras and other optical devices.

Various devices for fastening exchangeable objectives to photographic devices have been known from the prior art. Some of these devices include a lever member and consist, for example, of a double lever which is arranged on the objective mount, is under spring effect and, upon application of the member to be fastened, by means of a tooth automatically, lockingly engages a registering element of the camera.

These known fastening devices are released by application of pressure, for example by forces acting like tongs, whereby pressure is applied perpendicularly to the drawing off motion of the exchangeable objective to be released, i. e. in a direction toward the optical axis. Thus, in removing the exchangeable objective, two actions must be carried out in different directions, in the use of these known devices.

The main object of the present invention is to provide simplified and more convenient means for releasing exchangeable objectives and other attachments in optical devices, particularly in photographic apparatus.

According to the invention, this is attained by providing on the member to be fastened an angle lever which automatically, elastically enters a locking position upon applying, for example, the objective, whereby one arm of the angle lever is capable of being influenced only or mainly by a force, which is located in the direction of the drawing off motion of the member to be removed and is produced anyhow by the drawing off action carried out by hand. The surface to be acted on by the drawing off motion, of the operating angle lever arm is preferably knurled in suitable manner, so that it can be easier gripped.

In releasing a removable member, e. g. an objective, operation can be further facilitated according to the present invention by arranging the actuating arm of the angle lever in such manner that it enters the range of another actuating member and penetrates the latter. For example, the actuating arm can be an independent part of the knurled ring rim for adjustment of the objective and made to fit the latter. Thus, upon its actuation, this part is caused to move perpendicularly relative to the turning movement of said rim for focusing the objective and, when actuated, it will emerge from the range of the knurled rim, owing to its swinging arrangement. The actuating arm of the angle lever can also be formed as a part of the knurled ring which serves for adjustment of the diaphragm or time, or merely for facilitating firm gripping. The advantage resulting from this consists in that two or more actuating members which have different functions and one of which belongs to the fastening device according to the present invention, are brought more or less near to each other and are adjusted in their design to each other, if desired.

The present invention can be adapted for fastening any auxiliary members or attachments to optical devices and is particularly suitable for use in cameras, for example for fastening front lenses, range finders, viewfinders, exposure meters, tripods and the like.

The appended drawings illustrate by way of example an embodiment of the invention, to which the invention is not limited.

In the drawings:

Fig. 1 is a partial side view of a camera provided with a firmly connected shutter device and a removable, exchangeable objective screwed on in the shutter casing for adjustment of the objective, shown partially in section;

Fig. 2 shows, in perspective illustration, the view denoted A in Fig. 1, of the actuating member.

Referring now to the drawings in detail, in Fig. 1 reference symbol 1 denotes the shutter casing of a camera 2. The shutter casing is provided in conventional manner with a ring 3 for the adjustment of time and with a female thread 4 for receiving a threaded tube 5. The front end of threaded tube 5 has an outer flange 6. Said threaded tube 5 has a guide surface 55 for exchangeable objective 7 which spans said tube. Two angle levers 8 are rotatably arranged about axes 9 in the body of exchangeable objective 7 on two opposite sides, in such manner that each of said angle levers is urged with tooth 111, arranged on its arm 11, radially in the direction toward the optical axis, by bent springs 10. In removed condition of the exchangeable objective, actuating arm 13 of angle lever 8, which is knurled at 12 in peripheral direction relative to the exchangeable objective, lies against stop 14 formed by the body of the exchangeable objective. Upon applying exchangeable objective 7 to smooth portion 55 of threaded tube 5, tooth 111 of each angle lever 8 is pressed outward by the action of its inclined surface 15 on outer flange 6 of threaded tube 5 and, under the action of bent spring 10, said tooth lockingly engages, by means of its inner edge 16 provided with a wedge angle or taper a, the back surface of outer flange 6. In this manner, the exchangeable objective is safely bound by means of inner edge 16 of tooth 111 and annular stop 17 provided in the exchangeable objective 7, to outer flange 6 of threaded tube 5, in axial direction and is simultaneously frictionally connected with threaded tube 5 in the direction of rotation.

Exchangeable objective 7 is provided with an adjusting rim 18 knurled in axial direction. This knurled rim 18 has two interruptions, at which angle levers 8 emerge from the body of the exchangeable objective in outward direction, whereby their design corresponds to the cross-sectional design of knurled rim 18. Thus, the two elements are distinguished by the direction of knurling.

In order to remove the exchangeable objective, it is gripped by hand in conventional manner, in the range of lever 13, as shown in Fig. 1. Upon pulling the objective in the direction of arrow 19, without any additional aid force is transmitted to both arms 13, whereby angle levers 8 are caused to swing and then teeth 111 get off from outer flange 6 of threaded tube 5. This function is essentially supported by the rim 18 being knurled in axial direction and the actuating arm 13 in peripheral direction, whereby low friction results at 18, but maximum friction at 13, in connection with the removal of the objective.

It will be understood that this invention is not limited to the designs, elements, arrangements and other details specifically described and illustrated in the drawings and can be carried out with various modifications without departing from the scope of the invention, as defined in the appended claims.

What is claimed is:

1. Arrangement for releasably fastening exchangeable objectives to photographic cameras, comprising at least one manually operable locking means tiltably arranged in the mounting of the exchangeable objective, in combination with an outer flange provided at the outer end of the camera part for receiving the objective; said locking means consisting of an angle lever pivotally arranged on a pin provided in the mounting of the exchangeable objective and extending perpendicularly relative to the optical axis of the exchangeable objective; one free arm of the angle lever being provided with a locking tooth adapted to lockingly engage the rear surface of said outer flange, in rest position of the locking means; the other free arm of the angle lever being provided with a manually operable element for causing tilting of the angle lever, in order to release engagement of the outer flange by said tooth and allow removal of the exchangeable objective from the camera.

2. An arrangement as claimed in claim 1, in which a stop is formed in an exchangeable objective to be fastened to a photographic camera and an inner surface of the locking tooth is tapered relative to the direction of motion of the tooth by such amount as to fasten the exchangeable objective to the photographic camera in cooperation with said stop, by wedging effect.

3. An arrangement as claimed in claim 1, in which a photographic camera is provided with a shutter casing and with a tube having an outer flange at its outer end and being adjustably connected at its inner end by a thread with said casing, and a stop is formed in the exchangeable objective; the locking tooth being adapted to engage the back surface of said outer flange and, being urged to locking position by the spring, in cooperation with said stop and a wedging surface provided on the tooth, is adapted to bring the exchangeable objective and said threaded tube, in wedged relation, in which the objective is coupled with said tube and is adjustable in the direction of rotation of said tube.

4. An arrangement as claimed in claim 1, comprising a photographic camera and an exchangeable objective, in which the angle lever arm provided with the actuating element, is arranged radially to the optical axis of the camera, has a knurled outer surface and slightly projects from the mount of the exchangeable objective, in order to facilitate handling of the actuating element.

5. An arrangement as claimed in claim 1, comprising a photographic camera and an exchangeable objective, said objective having a knurled rim for adjusting the objective, provided with two interruptions for allowing actuating arms of the angle levers to project in outward direction, the design of said arms being adjusted to the design of the knurled rim.

6. An arrangement as claimed in claim 1, comprising a photographic camera and an exchangeable objective, said objective having a knurled rim for adjusting the objective, provided with two interruptions for allowing actuating arms of the angle levers to project in outward direction, the design of said arms being adjusted to the design of the knurled rim, the actuating arms being knurled in peripheral direction and said rim being knurled parallel to the optical axis.

References Cited in the file of this patent
UNITED STATES PATENTS

| | | |
|---|---|---|
| 1,705,385 | Wittel | Mar. 12, 1929 |
| 1,736,436 | Fuerst | Nov. 19, 1929 |
| 2,067,189 | Howell | Jan. 12, 1937 |
| 2,136,149 | Nuchterlein | Nov. 8, 1938 |
| 2,618,201 | Brohl et al. | Nov. 18, 1952 |
| 2,649,024 | Goldhamer | Aug. 18, 1953 |